United States Patent [19]
Gardner-Chavis et al.

[11] Patent Number: 5,171,558
[45] Date of Patent: Dec. 15, 1992

[54] CATALYTIC DECOMPOSITION OF CYANURIC ACID AND USE OF PRODUCT TO REDUCE NITROGEN OXIDE EMISSIONS

[75] Inventors: Ralph A. Gardner-Chavis, Cleveland; Michael P. May, Canton, both of Ohio

[73] Assignee: Molecular Technology Corporation, Canton, Ohio

[21] Appl. No.: 766,589

[22] Filed: Sep. 27, 1991

Related U.S. Application Data

[62] Division of Ser. No. 585,886, Sep. 20, 1990, Pat. No. 5,087,431.

[51] Int. Cl.$^5$ .................. C01B 21/12; C01B 21/00; C01C 3/14; B01J 8/00
[52] U.S. Cl. .................. 423/365; 423/235; 423/239
[58] Field of Search .................. 423/235, 235 D, 239, 423/239 A, 358, 365

[56] References Cited

U.S. PATENT DOCUMENTS

| | | | |
|---|---|---|---|
| 3,900,554 | 8/1975 | Lyon | 423/235 |
| 4,208,386 | 6/1980 | Arand et al. | 423/235 |
| 4,325,924 | 4/1982 | Arand et al. | 423/235 |
| 4,335,084 | 6/1982 | Brogan | 423/235 |
| 4,719,092 | 1/1988 | Bowers | 423/235 |
| 4,731,231 | 3/1988 | Perry | 423/235 |
| 4,743,436 | 5/1988 | Lyon | 423/235 |
| 4,800,068 | 1/1989 | Perry | 422/173 |
| 4,849,192 | 7/1989 | Lyon | 423/235 |
| 4,851,201 | 7/1989 | Heap et al. | 423/235 |
| 4,861,567 | 8/1987 | Heap | 423/235 |

FOREIGN PATENT DOCUMENTS 2-191524  7/1990  Japan .................. 423/239

OTHER PUBLICATIONS

"Reducing NO$_x$ Emissions," Power Sep. 1988, pp. S-1 to S-13.
"Post-Combustion Methods for Control of NO$_x$ Emissions", by H. S. Rosenberg, L. M. Curran, A. V. Slack, J. Ando, and J. H. Oxley, *Prog. Energy Combust. Sci.*, vol. 6, pp. 287-302.
R. A. Perry and D. L. Siebers, Nature vol. 324, 18/25, pp. 657-658.

*Primary Examiner*—Gregory A. Heller
*Attorney, Agent, or Firm*—Renner, Otto, Boisselle & Sklar

[57] ABSTRACT

A method is described for decomposing cyanuric acid at temperatures of less than about 1000° F., and the method comprises heating the cyanuric acid in the presence of a decomposition catalyst which is effective at below about 1000° F. Examples of useful decomposition catalysts are zirconium, phosphorus and mixtures thereof. Preferably at least some of the zirconium or phosphorus is in the plus four oxidation state. A method also is described for reducing the nitrogen oxide content of gas streams which comprises contacting the gas streams containing nitrogen oxide with an amount of the gaseous decomposition product mixture obtained by decomposing cyanuric acid in the presence of a decomposition catalyst at a temperature of less than about 1000° F.

15 Claims, 2 Drawing Sheets

CATALYTIC DECOMPOSITION OF CYANURIC ACID AND USE OF PRODUCT TO REDUCE NITROGEN OXIDE EMISSIONS

This is a division of application Ser. No. 07/585,886, filed Sep. 20, 1990, now U.S. Pat. No. 5,087,431.

FIELD OF THE INVENTION

The present invention relates to the catalytic decomposition of cyanuric acid and to the use of the product of the decomposition to reduce nitrogen oxide emissions and thereby reduce pollution of the atmosphere. More particularly, the present invention relates to the non-catalytic, selective reduction of nitrogen oxides by cyanuric acid decomposition product gases.

BACKGROUND OF THE INVENTION

There has been considerable effort devoted in recent years to solve various ecological and environmental problems such as air pollution, acid rain, etc. Combustion effluents and waste products from various sources are a major source of air pollution when discharged into the atmosphere. Unless the waste products are treated to remove deleterious components, the degradation of the environment will continue. Acid rain, forest and vegetation decline, changes in the ozone layer, harmful and irritating smog, etc., are examples of the results of the pollution of the atmosphere.

The common sources of pollution include internal combustion engines, industrial plants, utility boilers, gas turbines, and commercial establishments such as service stations, dry cleaners, etc. It has been estimated that power plants are responsible for about ⅓ of the annual $NO_x$ emissions while mobile sources such as automobiles and trucks are responsible for about 40% to about 50%. The types of air pollutants generated by such facilities include particulate emissions such as coal ash, sulphur compounds such as $SO_2$ and $SO_3$, carbon monoxide, ozone, and nitrogen oxides, commonly referred to collectively as "$NO_x$".

One of the common components found in polluted air is nitrogen dioxide ($NO_2$) which is known to be an extremely poisonous material. Nitrogen dioxide is introduced into the atmosphere from the various sources such as industrial plants producing nitric acid, but a major source of nitrogen dioxide is from nitric oxide (NO) formed by combustion processes of the types described above. The nitrogen oxide is formed during such combustion processes by (1) the reaction of nitrogen with atmospheric oxygen in the high temperature portion of the flame ("thermal fixation); and (2) the oxidation of organic nitrogen compounds in the fuel on burning. The nitric oxide formed on combustion is converted to nitrogen dioxide on contact with air in the atmosphere.

Various procedures have been suggested to remove the oxides of nitrogen from waste gases so that the gases may be discharged into the atmosphere without harm to the environment. Nitrous oxides emissions from boilers, gas turbines and internal combustion engines have been reduced by modifying the design of the engine or boiler to be more efficient or to operate at a lower temperature. Other proposals for reducing nitrogen oxide emissions involve use of various chemicals to reduce the nitrogen oxide content of effluent gases by converting the nitrogen oxides to innocuous gases. Such chemical processes, however, generally requires extremely high temperatures such as in the range of about 1600° to about 2000° F. The temperatures of some of these chemical reactions for reducing nitrogen oxide content have been reduced by utilizing catalysts which are effective in promoting the reduction of nitrogen oxide, but using a catalyst has certain disadvantages such as the expense of the catalyst, the life of the catalyst, the expense and difficulty of contacting the combustion effluents with the catalyst, etc. Accordingly, there has been continued emphasis on procedures for reducing nitrogen oxide emissions which do not involve the direct use of catalysts. Various techniques for reducing $NO_x$ emissions from various combustion processes are described in the article entitled "Reducing $NO_x$ Emissions," Power September 1988, pp S-1 to S-13.

Among the chemicals which have been suggested as being useful in reducing the nitrogen oxide content of combustion effluents are nitrogen-containing compounds such as ammonia, urea, cyanuric acid, etc. For example, U.S. Pat. Nos. 3,900,554; 4,335,084; 4,473,436; 4,849,192; and 4,851,201 describe processes utilizing ammonia to reduce nitrogen oxide emissions.

The use of ammonia, with or without catalysts, is a subject of the paper entitled "Post-combustion Methods for Control of $NO_x$ Emissions" by H. S. Rosenberg, L. M. Curran, A. V. Slack, J. Ando, and J. H. Oxley, *Prog. Energy Combust. Sci*, Vol. 6, pp. 287–302. The use of urea is described in U.S. Pat. Nos. 4,208,386; 4,325,924; 4,719,092; and 4,851,201. The use of cyanuric acid, and more specifically, the decomposition product of cyanuric acid, isocyanic acid, for reducing the nitrogen oxide content of combustion effluents is described in U.S. Pat. Nos. 4,731,231; 4,800,068; and 4,861,567; and by R. A. Perry and D. L. Siebers, *Nature* Vol. 324, 18/25, pp 657, 658. Perry proposes that isocyanic acid (HNCO) is formed from the decomposition of cyanuric acid when cyanuric acid is heated above about 330° C. When the isocyanic acid is mixed with the exhaust gas stream at temperatures 400° C. or higher, a series of reactions is proposed to occur the results in the loss of HCNO and NO.

As mentioned above, the use of a thermal decomposition product of cyanuric acid, HNCO, for reducing the NO content of effluent gases has been suggested. One of the disadvantages of such processes is the high temperatures required for the effective decomposition of cyanuric acid. In general, temperatures greater than 300° C. are required (U.S. Pat. No. 4,731,231), and at the lower range, the sublimation rate is not sufficient to generate to sufficient decomposition product to provide an economic and commercial process for reducing $NO_x$ emissions. U.S. Pat. No. 4,861,567 teaches that decomposition temperatures of from about 1000° F. are more common, and the preferred temperature range for the thermal decomposition is from about 1400° F. to about 2400° F.

SUMMARY OF THE INVENTION

A method is described for decomposing cyanuric acid at temperatures of less than about 1000° F., and the method comprises heating the cyanuric acid in the presence of a decomposition catalyst which is effective at below about 1000° F. Examples of useful decomposition catalysts are zirconium, phosphorus and mixtures thereof. Preferably at least some of the zirconium or phosphorus is in the plus four oxidation state. A method also is described for reducing the nitrogen oxide content of gas streams which comprises contacting the gas streams containing nitrogen oxide with an amount of the gaseous decomposition product mixture obtained by decomposing cyanuric acid in the presence of a decomposition catalyst at a temperature of less than about 1000° C.

DESCRIPTION OF THE PREFERRED EMBODIMENTS

Figure 2:
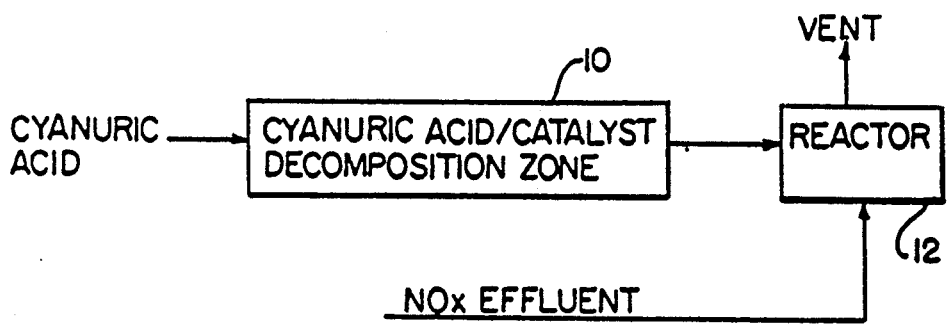
FIG. 2 is a flow diagram illustrating one method of the present invention for reducing the $NO_x$ content of gases. In this method, the catalyst and the cyanuric acid are in contact with each other in the same vessel.

Throughout the specification and claims, the terms "nitrogen oxide(s)" and "$NO_x$" are used in the generic sense to include the various nitrogen oxide compounds such as nitrous oxide ($N_2O$), nitric oxide (NO) and nitrogen dioxide ($NO_2$).

In one embodiment, the present invention is a method of decomposing cyanuric acid at temperatures at less than 1000° F., and the method comprises heating the cyanuric acid in the presence of a decomposition catalyst. In a preferred embodiment, the cyanuric acid is decomposed in a decomposition zone which does not contain any of the nitrogen oxide containing gas which is to be purified. In this manner, the catalyst is not subjected to the poisoning effect of the effluent gases and can be utilized in the decomposition of the cyanuric acid for extended periods. Accordingly, the method of the present invention for reducing the nitrogen oxide content of effluent gases is essentially a selective, thermal, non-catalytic reduction process (SNR) which can be conducted at temperatures lower than the temperatures normally utilized in SNR processes.

The cyanuric acid which is utilized in the present invention is commercially available, and may be generally represented by the formula $(HOCN)_3$. Throughout this specification in claims, reference to cyanuric acid is intended to include reference to its tautomer, isocyanuric acid, since, for purposes of this invention, the two forms are equivalent.

Prior art patents and publications such U.S. Pat. Nos. 4,731,231; 4,800,068; and 4,861,567, and the article by Perry in *Nature* described previously suggest that the thermal, non-catalytic decomposition of cyanuric acid results in the formation of isocyanic acid (HNCO) which then reacts with hydrogen to form $NH_2$ free radicals. The $NH_2$ free radicals react with NO to form $N_2$ and $H_2O$.

The molecular species obtained by the catalytic decomposition of cyanuric acid in accordance with the method of the present invention have not been identified, and the identification of the species contained in a decomposition product is not required. It is significant, however, that the decomposition product obtained by the catalytic decomposition of cyanuric acid at a temperature below about 1000° F. is useful and successful in reducing the nitrogen oxide content of gas streams.

Although we do not wish to be bound by any theory, one possible decomposition reaction which may be postulated is

$$(HNCO)_3 \rightarrow 3NCO + 3/2H_2.$$

The NCO in the decomposition product gas then reacts with NO to form $N_2$ and $CO_2$.

It has now been observed that cyanuric acid can be decomposed at a relatively low temperature below about 1000° F. utilizing a catalyst which promotes the decomposition reaction. Examples of such decomposition catalysts include zirconium, phosphorus, and mixtures of zirconium and phosphorus. The oxides of zirconium and phosphorus are examples of compounds useful as catalysts. The catalysts may also contain other metals. In a preferred embodiment, the catalysts comprise zirconium in the plus four oxidation state, phosphorus in the plus four oxidation state, or mixtures thereof. Compounds of zirconium or phosphorus containing at least some zirconium or phosphorus in the plus four oxidation state are preferred as catalysts. Zirconium and phosphorus in the oxide forms are examples of compounds which may contain zirconium and phosphorus in the plus four oxidation state. An example of a zirconium compound containing zirconium in the plus four oxidation state is zirconium oxide. An example of a phosphorus material which may contain at least some phosphorus in the plus four oxidation state is phosphorus pentoxide.

The zirconium catalyst of the types which can be utilized in the method of the present invention are commercially available and they contain at least some zirconium in the plus four oxidation state. For example, the catalyst may be commercially available mixed-metal oxide catalysts which contain at least some zirconium or phosphorus in the plus four oxidation state. An example of a commercial zirconium-containing catalyst useful in the method of this invention is the zirconia catalyst ZR-0304T1/8 available from the Engelhard Corporation.

The catalyst utilized in the method of the present invention may be formed in any conventional manner such as tableting, pelleting, etc., or the active catalyst material can be supported on a carrier. The carrier is generally inert and may include silica, alumina, clay, alumina-silica, silicon carbide, or even zirconia. The catalyst material can be deposited upon the carrier by techniques well known to those skilled in the art such as by depositing a solution containing the catalytic components on the carrier and thereafter drying and calcining the material. Utilizing these techniques, the catalytic components may be either coated on or impregnated in a carrier.

Cyanuric acid may be decomposed in accordance with the method of the present invention by contacting the cyanuric acid with the catalyst at a temperature below about 1000° F., and more generally at a temperature of from about 760° F. to about 960° F. The contact between the cyanuric acid and the catalyst can be effected by mixing the cyanuric acid with the catalyst prior to subjecting the mixture to the elevated temperatures. Alternatively, cyanuric acid can be first vaporized at an elevated temperature such as about 500° F. and above, and the vapors thereafter brought into contact with the catalyst to effect the decomposition at a temperature below about 1000° F. The latter process presently is preferred since it appears that this process results in an increase in the useful life of the catalyst, and, in some instances, it appears that the decomposition product gas obtained by first vaporizing the cyanuric acid followed by catalytic decomposition is a more effective product mixture for reducing the nitrogen oxide content of effluent gases.

Figure 1:
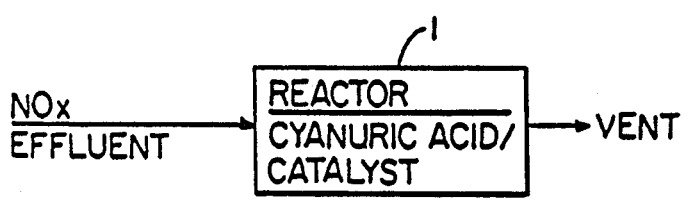
FIG. 1 is a diagram showing the static procedure of the invention wherein the $NO_x$ gas, catalyst and cyanuric acid are brought together in the same vessel (reactor).

The procedures for carrying out the method of the present invention are illustrated in FIGS. 1–4. In FIG. 1, a reactor vessel 1 contains the cyanuric acid and the catalyst, and the $NO_x$ containing gas is added to the reactor. The contents of the reactor are then heated to an elevated temperature to catalytically decompose the cyanuric acid to a gaseous decomposition product and reduce the $NO_x$ content. In FIG. 2, the cyanuric acid and the catalyst are present in the decomposition zone 10 where the combination is heated to an elevated temperature to effect decomposition of the cyanuric acid into a gaseous decomposition product containing species which are reactive with nitric oxide. The gaseous decomposition product is advanced to reactor 12 where the decomposition product is brought into contact with the gas stream containing $NO_x$ at a temperature sufficient to effect a reaction between reactive species of the gaseous decomposition product and $NO_x$. The period of contact between the gaseous decomposition product and the $NO_x$-containing gas is dependent upon a variety of factors including: concentration of $NO_x$ in the gas; the amount of reactive species in the gaseous decomposition product which is dependent in part upon the amount of cyanuric acid in the decomposition zone and the rate of decomposition of the cyanuric acid; the temperature of the gases within the reactor; the flow rate of the gases in the reactor; the period of time between formation of the gaseous decomposition product and the contact of the gaseous decomposition products with the $NO_x$; etc. The gas exiting the reactor 12 which contains a reduced concentration of $NO_x$ is vented to the atmosphere.

Figure 3:
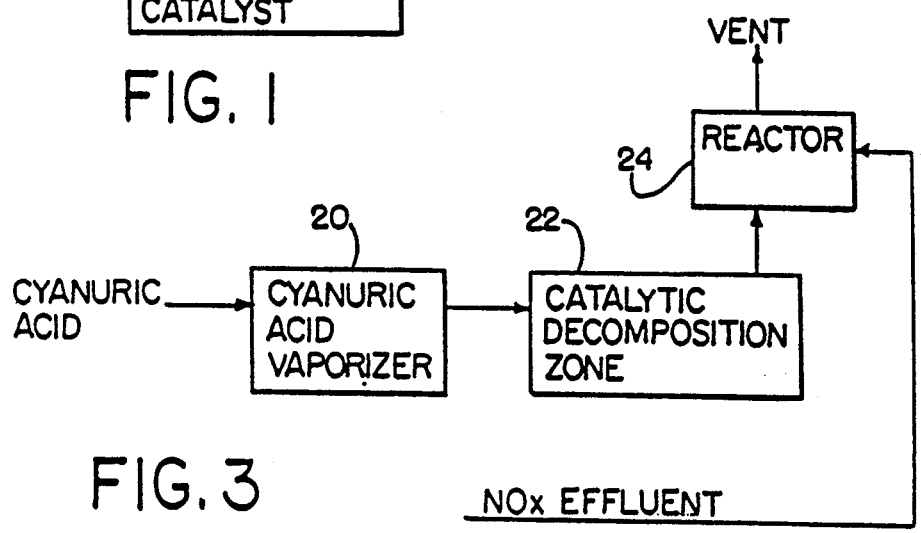
FIG. 3 is a flow diagram illustrating another example of a method of the present invention. In this method the cyanuric acid and the decomposition catalyst are maintained in separate vessels which are separated from the gas containing $NO_x$.

In the embodiment illustrated in FIG. 3, cyanuric acid is vaporized in vaporizer 20 by heating to an elevated temperature such as about 500° F. and above, and the cyanuric acid vapors then are advanced to decomposition zone 22 which contains a catalyst in accordance with the method of the present invention. When the vaporized cyanuric acid is heated to a temperature of up to about 1000° F. in the decomposition zone in the presence of the catalyst, the cyanuric acid decomposes to form a gaseous decomposition product which is then advanced to reactor 24. In reactor 24 the gaseous decomposition product from the decomposition zone is brought into contact with a nitrogen oxide-containing gas resulting in a reaction which converts the nitrogen oxides to innocuous gases such as nitrogen, carbon dioxide, and water vapor which may then be vented to the atmosphere. Cyanuric acid can be vaporized in the vaporizer 20 at temperatures from about 500° F. to about 1000° F., and more generally from temperatures of about 600° to 700° F. The temperatures within the catalytic decomposition zone 10 in FIG. 2 and zone 22 in FIG. 3, will generally be below about 1000° F., more generally will be at a temperature between about 760° to 960° F. In one preferred embodiment, the decomposition of the cyanuric acid in the presence of the catalyst is effected at a temperature from about 800° F. to about 950° F.

Figure 4:
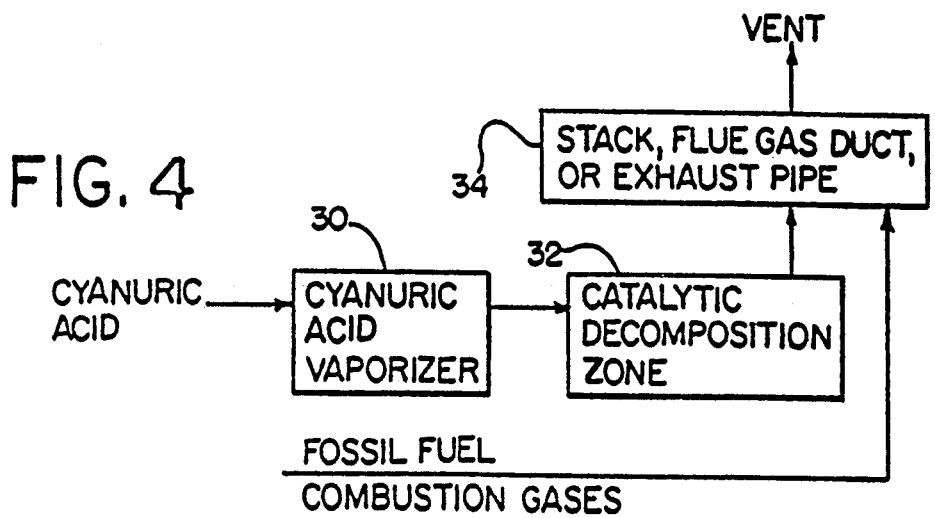
FIG. 4 is a flow diagram illustrating an example of this invention for reducing the $NO_x$ content of fossil fuel combustion gas.

FIG. 4 illustrates the method of the present invention used to reduce the $NO_x$ content of fossil fuel combustion gases. Fossil fuels contain nitrogen compounds and are commonly used in internal combustion engines, hydrocarbon fueled power plants, coal-fired utility boilers, gas turbines, and other similar installations. The combustion gases which come out of the exhaust pipes or stacks will contain $NO_x$ compounds which pollute the air. The $NO_x$ concentration of such exhaust gases can be reduced in accordance with the embodiment of FIG. 4 by treating the combustion gas in an exhaust pipe or in a gas stack or duct with the cyanuric acid decomposition product in accordance with the invention. Cyanuric acid is charged to a vaporizer 30 where the cyanuric acid is vaporized by heating to a temperature of about 600° F. or higher. The vapors are advanced to a catalytic decomposition zone 34 where the vapors are decomposed at a temperature below about 1000° F. The gaseous decomposition product is advanced to the stack, flue gas duct or exhaust pipe 34 where the decomposition product reacts with the $NO_x$ of the combustion gases passing through the stack, flue gas duct or exhaust pipe thereby converting the $NO_x$ to harmless gases which can be vented to the atmosphere.

The reaction between nitrogen oxide-containing gas and the gaseous decomposition product obtained from the catalytic decomposition of cyanuric acid can be effected at temperatures within a range of from about 300° F. to about 1600° F. More generally, the reaction can be effected at temperatures of about 700° F. to about 1200° F., and this reaction is effected in the absence of any catalyst. The reaction results in a significant reduction in the concentration of nitric oxide in the gas.

The amount of cyanuric acid introduced into the reactor 1 of FIG. 1, decomposition zone 10 of FIG. 2, zone 22 of FIG. 3, or zone 32 of FIG. 4, is an amount which will generate sufficient reactive species in the decomposition gas to react with the nitric oxide in the effluent gas to be treated. A slight excess of the stoichiometric amount of the reactive species generated from the cyanuric acid is desirable to insure maximum reduction of nitric oxide in the gas. Accordingly, since it is assumed that one mole of cyanuric acid generates three reactive species, it would theoretically appear that one-third mole cyanuric acid would be effective to react with one mole of nitric oxide. In practice, the larger amounts of cyanuric acid may be required depending upon the particular process and apparatus utilized for effecting the decomposition and subsequent reaction with nitric oxide. For example, it has been observed that the gaseous decomposition products have characteristic half-lives, and if the period of time (lapsed time) between the generation of the gaseous decomposition products and contact with the nitric oxide approaches or exceeds the half-life of the reactive species, additional amounts of the reactive species will be required to reduce the nitric oxide content of the gas stream. For example, in a series of experiments, it has been determined at 800° F. and above, the half-life of a reactive species generated from the catalytic decomposition of cyanuric acid is in the range of about five minutes.

Thus, the efficiency of the gaseous decomposition products in reducing the nitric oxide concentration of the gas diminishes as the time to contact with the nitric oxide increases (see Examples 9-18 and FIG. 6), and additional amounts of reactive species in the decomposition products are required to increase the percent of nitric oxide reduction.

The nitrogen oxide containing gas streams which can be treated in accordance with this invention may be derived from various mobile and stationary sources. Mobile sources include internal combustion engines such as are used in trucks, buses and automobiles, and fixed or stationary sources of nitrogen oxide include stack gases from commercial and residential furnaces, kilns, residual oil and coal-fired utility boilers, industrial boilers, gas turbines, incinerators, diesel engine generators, etc.

The following examples illustrate the method of the present invention. Unless otherwise indicated in the following examples and elsewhere in the specification and claims, all parts and percentages are by volume or mole.

EXAMPLE 1 (FIG. 1)

A 75 cc stainless steel reactor is charged with 0.44 gms or cyanuric acid and 0.20 gms of zirconium oxide. After purging the reactor with helium, nitric oxide is added to the reactor at 44 psig, and the reactor is heated to a temperature of about 1010° F. over a period of about 6 hours. The reactor is then cooled, and the contents of the reactor analyzed. At the end of the reaction, the reactor contains 0% NO indicating 100% reduction of the nitric oxide.

EXAMPLE 2 (FIG. 1)

A reactor as is charged with 0.4055 gms of cyanuric acid and 0.2048 gms of zirconium oxide. After purging with helium, the reactor is charged with nitric oxide to a pressure of 42.8 psig. The contents of the reactor are then slowly heated to a temperature of about 830° F. over a period of about 4 hours. After cooling, analysis of the contents indicates 0% nitric oxide or a 100% reduction in nitric oxide.

COMPARATIVE EXAMPLE 2A (FIG. 1)

The general procedure of Example 2 is repeated except that the reactor is charged with 0.4030 gms of cyanuric acid, and no zirconium oxide is used. Nitric oxide is charged to the reactor at 42.8 psig, and the contents are heated slowly to a temperature of about 831° F. over a period of about 3 hours. At the end of this period, the reactor contains 40.43% nitric oxide indicating a nitric oxide reduction of only 56% when the catalyst is omitted illustrating the advantage of using the catalyzed decomposition products of this invention.

EXAMPLES 3-6

The general procedure of Example 1 is repeated except that the temperature within the reactor is varied as indicated in Table I. The results are summarized in Table I.

TABLE I

| | Static Experiment | | | |
|---|---|---|---|---|
| Example | Temp. (°F.) | % NO Final | % $CO_2$ Final | % NO Redn. |
| 3 | 749 | 33.3 | 9.58 | 22.3 |
| 4 | 770 | 16.1 | 40.9 | 83.6 |
| 5 | 809 | 0 | 38.8 | 100 |
| 6 | 900 | 0 | 42.9 | 100 |

Figure 5:
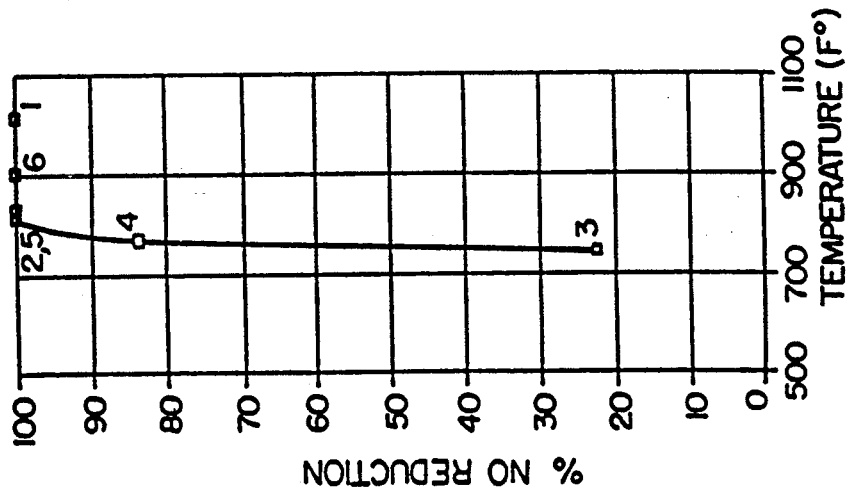
FIG. 5 is a graph of percent NO reduction vs. temperature obtained in Examples 1-6.

As can be seen from the results of Examples 1-6, zirconia is an effective catalyst for promoting the decomposition of cyanuric acid into a product gas which is effective in reducing the NO content of gases at relatively low temperatures, particularly between about 750 and about 900° F. FIG. 5 contains a graph of % NO reduction vs. temperature of Examples 1-6.

EXAMPLE 7 (FIG. 2)

This example utilizes a flow-tube reactor system and continuous flow of the gaseous decomposition products from the catalytic decomposition of cyanuric acid and nitric oxide. A mixture of 44 gms of cyanuric acid and 8 gms of zirconium oxide is prepared and charged to a decomposition tank. The decomposition tank is attached to a quartz tube reactor containing alumina maintained at a given elevated temperature. The quartz tube reactor is equipped with a tube through which nitric oxide gas can be introduced into the quartz tube reactor for reaction with the cyanuric acid decomposition gas. The quartz tube reactor also is equipped with an outlet through which the gas within the reactor can exit. The gases which exit the quartz tube reactor after the reaction between the nitric oxide and the cyanuric acid decomposition product advance to a condenser where water is removed, and the gas is then dried, analyzed and/or vented to the atmosphere.

In this example, the cyanuric acid and zirconium oxide are mixed thoroughly and charged to the decomposition tank. After purging with helium, the contents of the decomposition tank are heated to a temperature of about 700° F. and maintained within a temperature range from about 700° F. to about 843° F. for a period of about 3 hours. The decomposition gas from the decomposition tank is continuously advanced to the quartz tube reactor which is maintained at a temperature of from about 838° F. to about 1250° F. (an average temperature about 843° F.) as the nitric oxide is fed to the reactor. Analysis of the gas recovered from the quartz tube reactor indicates a NO reduction of 63.4%.

EXAMPLES 8-19 (FIG. 3)

In these examples, the cyanuric acid and catalyst are not premixed and charged to the decomposition tank. Cyanuric acid is charged to a vaporizing tank which is attached to a decomposition tank containing the catalyst. The exit gas from the decomposition tank advances to a quartz reactor containing alumina support. The quartz reactor is equipped with an inlet tube for nitric oxide and an exit tube for the gases flowing out of the reactor. The exit gases pass through a condenser, dryer, and an analyzer prior to being vented to the atmosphere.

About 44 gms of cyanuric acid are charged to the vaporization tank, and 75 cc. of zirconia catalyst ZR-0304T1/8 from the Engelhard Corporation are charged to the decomposition tank. The cyanuric acid in the vaporization tank is heated to a temperature of about 850° F. for a period of about 6 hours. The catalyst within the decomposition tank is heated to a temperature of about 800°-850° F., and the vaporized cyanuric acid is fed to the decomposition zone and decomposed in the presence of the catalyst. The quartz reactor tank is heated to a temperature of about 500° F. to about 1000° F. The flow of nitric oxide through the reactor vessel is begun as the decomposition gas is also fed to the reactor vessel. The elapsed time from decomposition to contact with NO in the reactor is noted. The gas which is recovered from the reactor is analyzed for NO content and the percent reduction determined. The details of these experiments and the results obtained are summarized in the following Table II.

TABLE II

| | Flow Reactor Experiments | | | | | |
|---|---|---|---|---|---|---|
| | Temp. (°F.) | | Flow rate | Time till | Stoichiometry | % NO |
| Example | Catalyst | Reactor | (ccpm) | contact (min.) | HNCO:NO | Reduction |
| 8 | 832 | 727 | 175 | 2.3 | 1.10 | 58.3 |
| 9 | 830 | 680 | 187 | 2.4 | 0.87 | 51 |
| 10 | 831 | 869 | 140 | 2.6 | 1.30 | 84 |
| 11 | 829 | 720 | 108 | 3.3 | 1.30 | 58.8 |
| 12 | 836 | 858 | 95 | 3.6 | 1.50 | 93.4 |
| 13 | 832 | 861 | 85 | 4.3 | 1.30 | 82.2 |
| 14 | 840 | 956 | 230 | 4.5 | 1.70 | 81.4 |
| 15 | 813 | 1020 | 167 | 5.6 | 1.70 | 67.3 |
| 16 | 841 | 915 | 130 | 7.5 | 1.60 | 54.2 |
| 17 | 840 | 898 | 150 | 7.5 | 1.50 | 52.9 |
| 18 | 837 | 932 | 135 | 8.0 | 1.30 | 55.2 |
| 19 | 844 | 983 | 120 | 8.5 | 1.40 | 45.3 |

Figure 6:
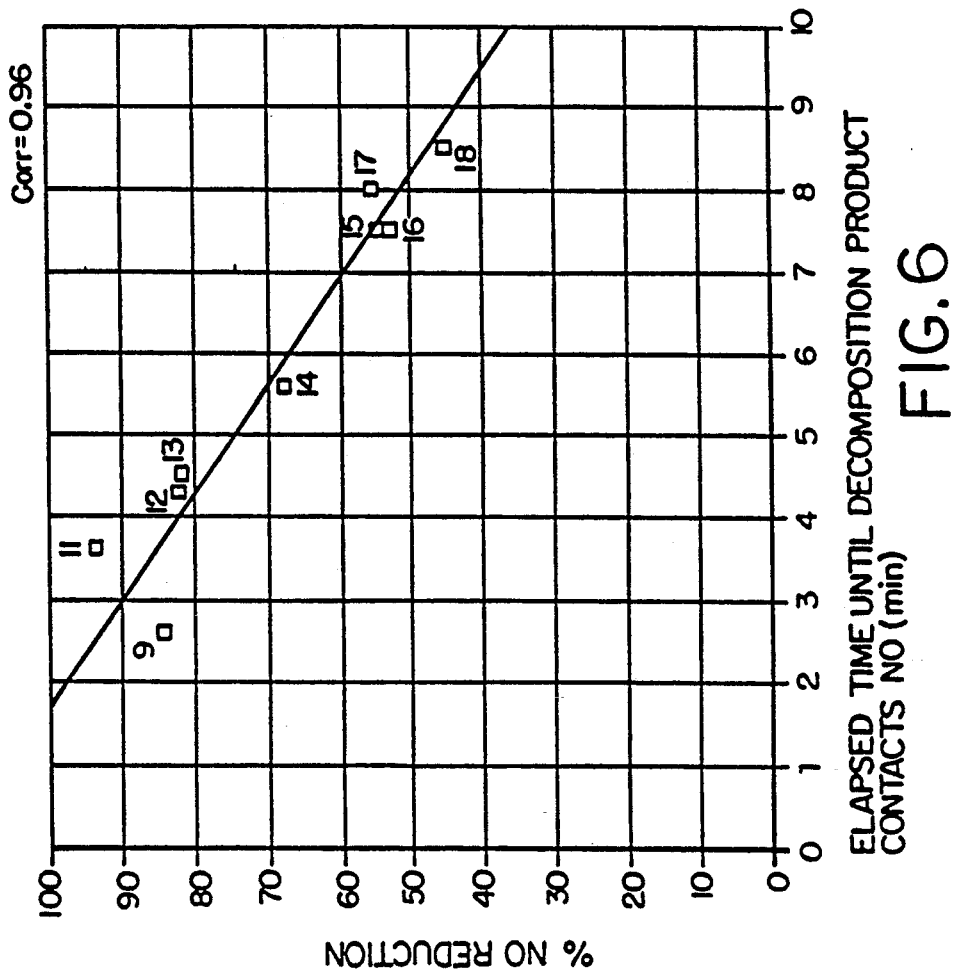
FIG. 6 is a graph of percent NO reduction vs. elapsed time (minutes) until the cyanuric acid decomposition product contacts the nitric oxide.

The relationship of elapsed time from formation of the cyanuric acid decomposition product to percent reduction of NO is illustrated in the graph of FIG. 6. As the elapsed time increases from about 2.5 to 8.5 minutes, the effectiveness of the decomposition product decreases.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

We claim:

1. A method of decomposing cyanuric acid at temperatures of from about 760° F. to about 1000° F. which comprises heating the cyanuric acid in the presence of a decomposition catalyst to form a product gas containing NCO radicals.

2. The method of claim 1 wherein the catalyst comprises zirconium.

3. The method of claim 1 wherein the catalyst comprises phosphorus.

4. The method of claim 1 wherein the catalyst comprises a mixture of zirconium and phosphorus.

5. The method of claim 1 wherein the catalyst comprises zirconium in the plus four oxidation state.

6. The method of claim 1 wherein the catalyst comprises phosphorus in the plus four oxidation state.

7. The method of claim 1 wherein the catalyst comprises a mixture of zirconium in the plus four oxidation state and phosphorus in the plus four oxidation state.

8. The method of claim 1 wherein the decomposition is effected at a temperature of from about 760° F. to about 960° F.

9. The method of claim 1 wherein the catalyst comprises zirconium oxide.

10. The method of claim 1 wherein the product obtained from the decomposition is reacted with one or more nitrogen oxide compounds.

11. A method of decomposing cyanuric acid which comprises heating the cyanuric acid to a temperature from about 760° F. to about 960° F. in the presence of an effective amount of a zirconium catalyst to form a product gas containing NCO radicals.

12. The method of claim 11 wherein the zirconium is in the plus four oxidation state.

13. The method of claim 11 wherein the catalyst is zirconium oxide.

14. The method of claim 11 wherein the temperature is from about 800° to about 950° F.

15. The method of claim 11 wherein the product obtained from the decomposition is reacted with one or more nitrogen oxide compounds.

* * * * *